(12) United States Patent
Walsh et al.

(10) Patent No.: US 8,788,572 B1
(45) Date of Patent: Jul. 22, 2014

(54) CACHING PROXY SERVER FOR A PEER-TO-PEER PHOTOSHARING SYSTEM

(75) Inventors: Richard J. Walsh, Raleigh, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1469 days.

(21) Appl. No.: 11/318,743

(22) Filed: Dec. 27, 2005

(51) Int. Cl.
G06F 15/16 (2006.01)
H04L 29/06 (2006.01)
G06F 15/173 (2006.01)
H04L 29/08 (2006.01)

(52) U.S. Cl.
CPC .......... *H04L 29/06* (2013.01); *H04L 29/08072* (2013.01); *H04L 29/0809* (2013.01)
USPC ......................................... 709/203; 709/223

(58) Field of Classification Search
CPC .............. H04L 29/06; H04L 29/08072; H04L 29/0809
USPC ................................................. 709/219, 203
See application file for complete search history.

(56) References Cited

U.S. PATENT DOCUMENTS

| | | | |
|---|---|---|---|
| 5,414,455 A | 5/1995 | Hooper et al. | |
| 5,915,252 A | 6/1999 | Misheski et al. | |
| 5,918,013 A | 6/1999 | Mighdoll et al. | |
| 6,073,168 A | 6/2000 | Mighdoll et al. | 709/217 |
| 6,292,835 B1 | 9/2001 | Huang et al. | |
| 6,330,606 B1 * | 12/2001 | Logue et al. | 709/226 |
| 6,349,336 B1 | 2/2002 | Sit et al. | |
| 6,449,657 B2 | 9/2002 | Stanbach, Jr. et al. | 709/245 |
| 6,463,508 B1 | 10/2002 | Wolf et al. | |
| 6,487,538 B1 | 11/2002 | Gupta et al. | 705/14 |
| 6,490,615 B1 | 12/2002 | Dias et al. | 709/219 |
| 6,553,409 B1 | 4/2003 | Zhang et al. | |
| 6,564,218 B1 | 5/2003 | Roth | |
| 6,571,239 B1 * | 5/2003 | Cole et al. | 1/1 |
| 6,622,168 B1 | 9/2003 | Datta | 709/219 |

(Continued)

FOREIGN PATENT DOCUMENTS

| | | | |
|---|---|---|---|
| JP | 2003341150 A | 12/2003 | |
| WO | WO 2005/099165 A2 | 10/2005 | H04L 9/00 |
| WO | WO 2006/026193 A2 | 3/2006 | G06F 15/16 |
| WO | WO 2006/055535 A2 | 5/2006 | G06F 15/16 |

OTHER PUBLICATIONS

CredoReference definitions, http://www.credoreference.com/entry/hmhighdef/cache.*

(Continued)

*Primary Examiner* — Joseph Greene
(74) *Attorney, Agent, or Firm* — Withrow & Terranova, PLLC (57) ABSTRACT

A caching proxy server for a hybrid peer-to-peer (P2P) photosharing system is provided. In general, the proxy server includes cache storing a number of previously requested digital images, a metadata database storing metadata including a number of keywords associated with each of the digital images stored in the cache, and a metadata usage table storing a number of "hits" for each of the keywords. When the used storage space in the cache reaches a predetermined limit, the proxy server examines the metadata usage table to determine a popularity of each of the keywords and removes digital images tagged with one or more of the least popular keywords until the used storage space in the cache decreases to a desirable level. As such, the proxy server ensures that digital images tagged with the most popular keywords remain in the proxy cache and are therefore available for subsequent requests.

16 Claims, 8 Drawing Sheets

(56) References Cited

U.S. PATENT DOCUMENTS

| | | | |
|---|---|---|---|
| 6,631,369 B1 | 10/2003 | Meyerzon et al. | |
| 6,633,850 B1 | 10/2003 | Gabbard et al. | 705/14 |
| 6,646,754 B1 | 11/2003 | Redd et al. | 358/1.13 |
| 6,651,141 B2 | 11/2003 | Adrangi | |
| 6,658,463 B1 | 12/2003 | Dillon et al. | |
| 6,697,850 B1 * | 2/2004 | Saunders | 709/219 |
| 6,754,699 B2 | 6/2004 | Swildens et al. | 709/217 |
| 6,757,684 B2 | 6/2004 | Svendsen et al. | |
| 6,757,705 B1 | 6/2004 | Pardikar et al. | |
| 6,859,807 B1 * | 2/2005 | Knight et al. | 1/1 |
| 6,891,635 B2 | 5/2005 | Dutta | 358/1.15 |
| 6,917,965 B2 | 7/2005 | Gupta et al. | |
| 6,925,485 B1 | 8/2005 | Wang et al. | 709/202 |
| 6,934,735 B1 | 8/2005 | Emens et al. | |
| 6,944,651 B2 | 9/2005 | Onyon et al. | |
| 6,954,752 B2 | 10/2005 | Iyengar | 707/8 |
| 7,027,513 B2 | 4/2006 | Zhang et al. | |
| 7,039,784 B1 | 5/2006 | Chen et al. | |
| 7,043,644 B2 | 5/2006 | DeBruine | |
| 7,092,699 B1 | 8/2006 | Hefter | |
| 7,181,438 B1 * | 2/2007 | Szabo | 1/1 |
| 7,272,645 B2 | 9/2007 | Chang et al. | |
| 7,587,446 B1 | 9/2009 | Onyon et al. | |
| 7,698,386 B2 | 4/2010 | Amidon et al. | |
| 7,719,971 B1 | 5/2010 | Issa | |
| 2001/0039520 A1 | 11/2001 | Nakade et al. | 705/27 |
| 2001/0052997 A1 | 12/2001 | Satake et al. | 358/1.15 |
| 2002/0023143 A1 | 2/2002 | Stephenson et al. | |
| 2002/0023230 A1 | 2/2002 | Bolnick et al. | |
| 2002/0046262 A1 | 4/2002 | Heilig et al. | |
| 2002/0062384 A1 * | 5/2002 | Tso | 709/229 |
| 2002/0065879 A1 | 5/2002 | Ambrose et al. | |
| 2002/0078134 A1 | 6/2002 | Stone et al. | |
| 2002/0103998 A1 | 8/2002 | DeBruine | 713/153 |
| 2002/0107934 A1 | 8/2002 | Lowery et al. | |
| 2002/0109729 A1 | 8/2002 | Dutta | 345/790 |
| 2002/0133601 A1 | 9/2002 | Kennamer et al. | |
| 2002/0138744 A1 | 9/2002 | Schleicher et al. | 713/187 |
| 2002/0178261 A1 | 11/2002 | Chang et al. | |
| 2002/0194590 A1 | 12/2002 | Pong | 725/32 |
| 2003/0001903 A1 | 1/2003 | Duffy | 345/810 |
| 2003/0005035 A1 * | 1/2003 | Rodgers | 709/202 |
| 2003/0009538 A1 | 1/2003 | Shah et al. | |
| 2003/0018639 A1 * | 1/2003 | Iyengar | 707/8 |
| 2003/0046586 A1 | 3/2003 | Bheemarasetti et al. | |
| 2003/0050863 A1 | 3/2003 | Radwin | 705/27 |
| 2003/0061272 A1 | 3/2003 | Krishnamurthy et al. | |
| 2003/0063770 A1 | 4/2003 | Svendsen et al. | |
| 2003/0063771 A1 | 4/2003 | Morris et al. | |
| 2003/0069968 A1 | 4/2003 | O'Neil et al. | |
| 2003/0084162 A1 | 5/2003 | Johnson et al. | |
| 2003/0105812 A1 | 6/2003 | Flowers, Jr. et al. | |
| 2003/0112823 A1 | 6/2003 | Collins et al. | |
| 2003/0154306 A1 | 8/2003 | Perry | |
| 2003/0191832 A1 | 10/2003 | Satyavolu et al. | |
| 2003/0195940 A1 * | 10/2003 | Basu et al. | 709/213 |
| 2003/0225885 A1 | 12/2003 | Rochberger et al. | |
| 2003/0236831 A1 | 12/2003 | Ortiz et al. | 709/204 |
| 2003/0236832 A1 | 12/2003 | McIntyre et al. | 709/204 |
| 2004/0003117 A1 | 1/2004 | McCoy et al. | 709/246 |
| 2004/0024828 A1 | 2/2004 | Miyagi et al. | 709/206 |
| 2004/0054860 A1 | 3/2004 | Dixit et al. | |
| 2004/0064512 A1 | 4/2004 | Arora et al. | |
| 2004/0064568 A1 | 4/2004 | Arora et al. | |
| 2004/0064693 A1 | 4/2004 | Pabla et al. | |
| 2004/0070678 A1 * | 4/2004 | Toyama et al. | 348/231.3 |
| 2004/0088348 A1 | 5/2004 | Yeager et al. | 709/202 |
| 2004/0098447 A1 | 5/2004 | Verbeke et al. | |
| 2004/0117258 A1 | 6/2004 | Kanbara | 705/14 |
| 2004/0139172 A1 | 7/2004 | Svendsen et al. | |
| 2004/0139227 A1 | 7/2004 | Takeda | |
| 2004/0148434 A1 | 7/2004 | Matsubara et al. | |
| 2004/0162871 A1 | 8/2004 | Pabla et al. | |
| 2004/0215523 A1 | 10/2004 | Wulff et al. | 705/26 |
| 2004/0215625 A1 | 10/2004 | Svendsen et al. | |
| 2004/0215721 A1 | 10/2004 | Szeto et al. | |
| 2005/0066063 A1 | 3/2005 | Grigorovitch et al. | |
| 2005/0071496 A1 | 3/2005 | Singal et al. | |
| 2005/0086386 A1 | 4/2005 | Shen et al. | |
| 2005/0091220 A1 | 4/2005 | Klemow | |
| 2005/0097085 A1 | 5/2005 | Shen et al. | |
| 2005/0114711 A1 | 5/2005 | Hesselink et al. | |
| 2005/0114757 A1 | 5/2005 | Sahota et al. | |
| 2005/0138176 A1 | 6/2005 | Singh et al. | |
| 2005/0147044 A1 | 7/2005 | Teodosiu et al. | |
| 2005/0160167 A1 | 7/2005 | Cheng et al. | |
| 2005/0171864 A1 | 8/2005 | Nakade et al. | 705/26 |
| 2005/0193083 A1 | 9/2005 | Han et al. | 709/213 |
| 2005/0198191 A1 | 9/2005 | Carlson et al. | 709/217 |
| 2005/0229243 A1 | 10/2005 | Svendsen et al. | |
| 2005/0246634 A1 | 11/2005 | Ortwein et al. | |
| 2005/0267973 A1 | 12/2005 | Carlson et al. | |
| 2006/0004691 A1 * | 1/2006 | Sifry | 707/1 |
| 2006/0010225 A1 | 1/2006 | Issa | |
| 2006/0064716 A1 | 3/2006 | Sull et al. | |
| 2006/0136551 A1 | 6/2006 | Amidon et al. | |
| 2006/0173985 A1 * | 8/2006 | Moore | 709/223 |
| 2006/0218275 A1 * | 9/2006 | Labio et al. | 709/224 |
| 2006/0242238 A1 | 10/2006 | Issa | |
| 2007/0064121 A1 | 3/2007 | Issa et al. | |
| 2007/0067493 A1 | 3/2007 | Issa | |
| 2007/0073878 A1 | 3/2007 | Issa | |
| 2007/0078993 A1 | 4/2007 | Issa | |
| 2007/0180075 A1 | 8/2007 | Chasman et al. | |
| 2007/0208583 A1 | 9/2007 | Ward | |
| 2007/0271380 A1 | 11/2007 | Chang et al. | |
| 2008/0178234 A1 | 7/2008 | Eyal et al. | |
| 2010/0169465 A1 | 7/2010 | Amidon et al. | |
| 2010/0211677 A1 | 8/2010 | Issa | |

OTHER PUBLICATIONS

Parker, Jason, "An Easy Way to Share Digital Photos with Others," ZDNet AnchorDesk Editorial Feature, Jun. 13, 2003, http://reviews-zdnet.com, p. 1.
The Apache Software Foundation, http://www.apache.org/.
Squid Web Proxy Cache, http://www.squid-cache.org/.
Reuven M. Lerner, "At the Forge Aggregating with Atom," (article), 2004, 7 pages, Linux Journal, vol. 2004, No. 127, 2004.
Reuven M. Lerner, "At the Forge: Bloglines Web Services," (article), 2005, 6 pages, Linux Journal, vol. 2005, No. 129, 2005.
Reuven M. Lerner, "At the Forge Aggregating Syndication Feeds," (article), 7 pages, 2004, Linux Journal, vol. 2004, No. 128, 2004.
Reuven M. Lerner, "At the Forge Bloglines Web Services, Continued," (article), 2005, 7 pages, Linux Journal, vol. 2005, No. 131, 2005.
Reuven M. Lerner, "At the Forge Syndication with RSS," (article), 2004, 9 pages, Linux Journal, vol. 2004, No. 126, 2004.
Scott Raymond, "Broadcatching with BitTorrent," (article), Dec. 16, 2003, 3 pages, http://web.archive.org/web/20040213093750/http://scottraymond.net/archive/4745.
Sung-Ju Lee et al., "An Interactive Video Delivery and Caching System Using Video Summarization," (article), Mar. 2002, pp. 424-435, Computer Communications, vol. 25, No. 4.
No Author, Wikipedia—Broadcatching, (website), obtained Mar. 5, 2008, 3 pages, http://en.wikipedia.org/wiki/Broadcatching.
Fielding, R. et al., "Hypertext Transfer Protocol—HTTP/1.1, " Request for Comments (RFC) 2616, Internet Engineering Task Force (IETF) Network Working Group, Jun. 1999, http://tools.ietf.org/pdf/rfc2616.pdf, 114 pages.

* cited by examiner

CACHING PROXY SERVER FOR A PEER-TO-PEER PHOTOSHARING SYSTEM

FIELD OF THE INVENTION

The present invention relates to a caching proxy server and more particularly relates to a caching proxy server for a peer-to-peer photosharing system.

BACKGROUND OF THE INVENTION

With the proliferation of digital cameras, numerous online photosharing services have emerged and are becoming widely accepted by photo enthusiasts. The photosharing services are generally based on one of two architectures. The first is a serving architecture where a central server hosts digital images for a number of users and provides photosharing services by serving the digital images to a web browser of a user or guest. The second is a peer-to-peer (P2P) architecture, where a user creates and stores photo albums on the user's computer. The user's computer then operates as a web server to provide the photo albums to the web browser of another user or guest.

For various reasons, many P2P systems now employ a hybrid P2P architecture wherein a proxy server operates as a single point of entry for all of the peer nodes in the P2P system. Thus, when a guest node or another peer node requests a digital image from a peer node, the request is first provided to the proxy server, which in turn provides the request to the peer node. In a similar fashion, the response from the peer node is typically routed through the proxy server.

In order to more quickly respond to requests from guest nodes, a cache that stores recently requested objects such as digital images may be implemented in the proxy server. As a result, subsequent requests for a digital image stored in the cache may be served directly from the proxy server rather than from a peer node. However, one issue with caching proxy servers is that the cache has limited storage space and must therefore be managed. More specifically, when the cache becomes full, the proxy server must remove objects from the cache before caching newly requested objects.

In order to manage the cache, typical caching proxy servers use algorithms such as Least Recently Used (LRU), Largest File First (LFF), Least Frequently Used (LFU), and Greedy Dual-Size algorithms. However, these algorithms fail to accurately cache objects such as digital images based on the actual content of the object. For example, if a digital image stored in cache is a picture of a person snowboarding, typical caching algorithms only consider the number or frequency of requests for the digital image. They do not consider a number or frequency of requests for digital images or other objects related to snowboarding or the person who is snowboarding. As such, there is a need for an improved caching proxy server.

SUMMARY OF THE INVENTION

The present invention relates to a caching proxy server for a hybrid peer-to-peer (P2P) photosharing system. In general, the proxy server includes a cache for storing a number of previously requested digital images, a metadata database for storing metadata including a number of keywords associated with each of the digital images stored in the cache, and a metadata usage table for storing a number of "hits" for each of the keywords. When the used storage space in the cache reaches a predetermined limit, the proxy server examines the metadata usage table to determine a popularity of each of the keywords and removes digital images tagged with one or more of the least popular keywords until the used storage space in the cache decreases to a desirable level. As such, the proxy server ensures that digital images tagged with the most popular keywords remain in the proxy cache and are therefore available for subsequent requests.

In addition, the caching proxy server may pre-fetch digital images from peer nodes in the P2P photosharing system. More specifically, in one embodiment, the caching proxy server may pre-fetch digital images associated with one or more of the most popular keywords from the peer nodes. In another embodiment, the caching proxy server may receive a request for a digital asset associated with a first keyword. Based on past requests, the proxy server may determine that requests for digital images associated with a second keyword are frequently received temporally proximate to requests for digital images associated with the first keyword. As such, the proxy server may pre-fetch digital assets associated with the second keyword from the peer nodes. In yet another embodiment, the caching proxy server may pre-fetch digital assets based on the current date. For example, the caching proxy server may determine that digital images associated with the keyword "Christmas" are frequently requested from December 1st through January 10th. As such, the caching proxy server may pre-fetch digital images from the peer nodes if the current date is within the range of December 1st through January 10th.

The caching proxy server may also provide additional content to a guest node based on metadata, such as keywords, associated with a requested digital image. More specifically, the caching proxy server may obtain additional content, such as an advertisement, based on one or more keywords associated with the requested digital image. Thereafter, the caching proxy server may provide both the additional content and the requested digital image to the guest node. In one embodiment, the requested digital image may be modified to include the additional content above, below, on the sides, or within the original digital image. Alternatively, a web page on which the requested digital image is displayed may be modified to include the additional content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a caching proxy server for a hybrid peer-to-peer (P2P) photosharing system. In general, the proxy server includes a cache storing a number of previously requested digital images, a metadata database storing metadata including a number of keywords associated with each of the digital images stored in the cache, and a metadata usage table storing a number of "hits" for each of the keywords. When the used storage space in the cache reaches a predetermined limit, the proxy server examines the metadata usage table to determine a popularity of each of the keywords and removes digital images tagged with one or more of the least popular keywords until the used storage space in the cache decreases to a desirable level. As such, the proxy server ensures that digital images tagged with the most popular keywords remain in the proxy cache and are therefore available for subsequent requests.

Although the description herein describes the present invention with respect to a hybrid peer-to-peer photosharing system, the present invention is equally applicable to any system where digital content is provided from a web server to a requesting node via a proxy server. Further, while the description herein focuses on digital images, the present invention is equally applicable to any digital asset, such as digital videos, digital audio, and the like.

Figure 1:
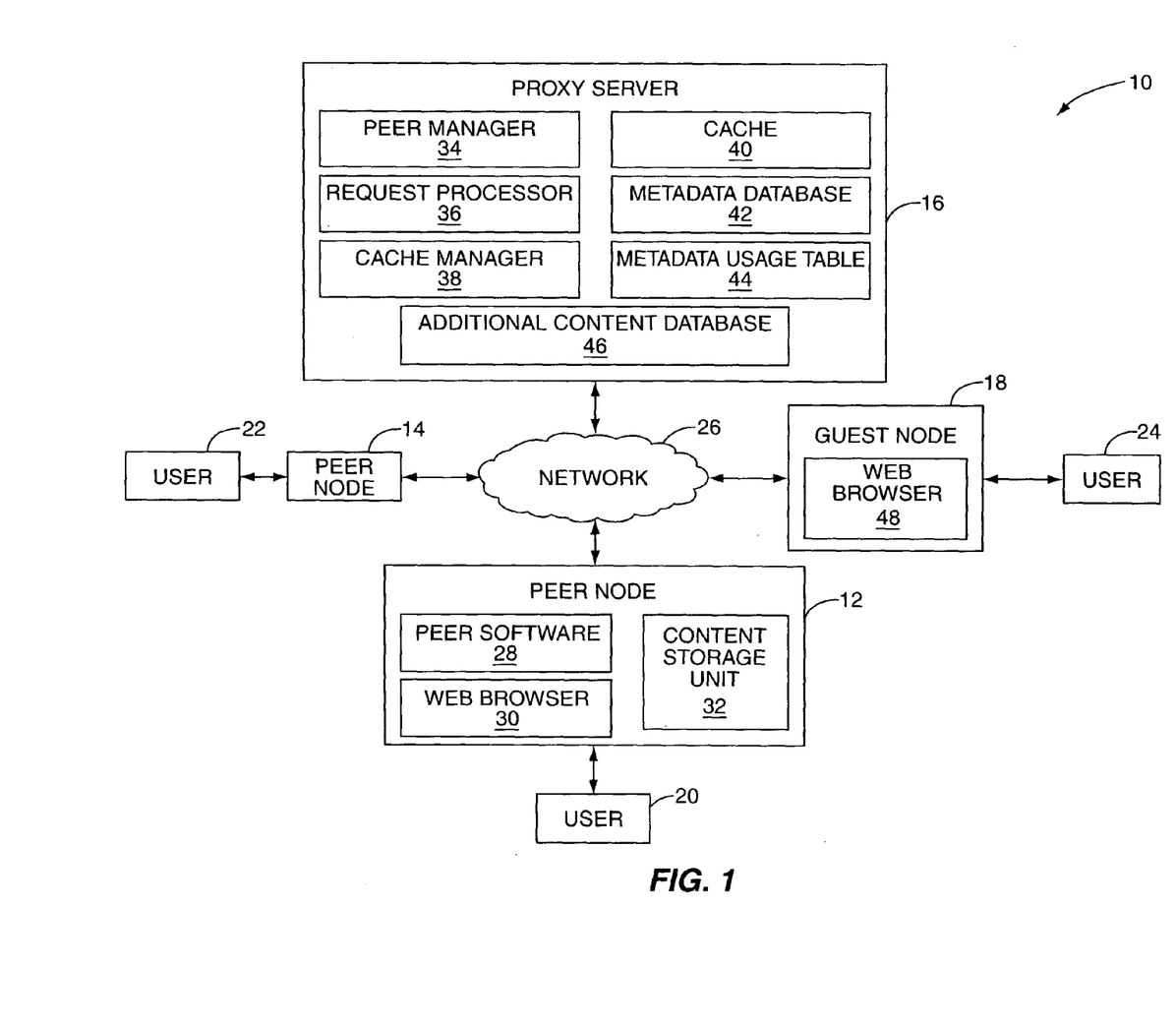
FIG. 1 illustrates an exemplary hybrid peer-to-peer (P2P) system incorporating a caching proxy server according to one embodiment of the present invention.

FIG. 1 illustrates an exemplary hybrid peer-to-peer (P2P) system 10 according to one embodiment of the present invention. The hybrid P2P system 10 includes peer nodes 12 and 14, a proxy server 16, a guest node 18, users 20 and 22 associated with the peer nodes 12 and 14, a user 24 associated with the guest node 18, and a network 26, which is preferably the Internet. There may be any number of peer nodes 12 and 14 and guest nodes 18. Note that while the proxy server 16 is illustrated as a single server, the proxy server 16 may alternatively be implemented as a number of servers.

In general, the system 10 operates to share digital images stored at the peer nodes 12 and 14 with the guest node 18. For example, when the user 20 at the peer node 12 desires to share digital images with the user 24 at the guest node 18, an invitation including a web link to the digital images is provided to the guest node 18. Thereafter, the user 24 may interact with the guest node 18 to activate the web link. In response, the guest node 18 generates a request for the digital images and sends the request to the proxy server 16. If the proxy server 16 has the requested digital images stored locally, the proxy server 16, in general, sends the requested digital images to the guest node 18. If the proxy server 16 does not have the requested digital images stored locally, the proxy server 16 requests the digital images from the peer node 12 and then sends the digital images to the guest node 18.

The peer nodes 12 and 14, which may also be referred to herein as web serving nodes, are personal computers, mobile terminals, Personal Digital Assistants (PDAs), or the like having access to the network 26. As illustrated, the peer node 12 includes peer software 28, optionally a web browser 30, and a content storage unit 32. It should be noted that the discussion herein of the peer node 12 is equally applicable to the peer node 14. The content storage unit 32 may be implemented in memory such as, but not limited to, Random Access Memory (RAM) or some other storage unit such as, but not limited to, a hard disk drive. The content storage unit 32 operates to store digital images such as digital images, digital videos, digital audio, or the like.

The proxy server 16, which may also be referred to as a central node, includes a peer manager 34, a request processor 36, and a cache manager 38, wherein each of these functions may be implemented in software, hardware, or a combination thereof. The peer manager 34 operates to manage connections with the peer nodes 12 and 14. For example, the peer nodes 12 and 14 may establish connections, such as socket connections, with the proxy server 16 upon connecting to the network 26. The peer manager 34 operates to store information identifying the connections with the peer nodes 12 and 14 which may thereafter be used to route requests to the peer nodes 12 and 14. For more information, the interested reader is directed to U.S. Patent Application Publication No. 2005/0229243, entitled METHOD AND SYSTEM FOR PROVIDING WEB BROWSING THROUGH A FIREWALL IN A PEER TO PEER NETWORK, filed on Mar. 31, 2004, currently pending, which is hereby incorporated by reference in its entirety.

As described in detail below, the request processor 36 operates to handle requests from the guest node 18, and the cache manager 38 operates to manage cache 40 based on the popularity of keywords associated with digital images stored in the cache 40.

The proxy server 16 also includes the cache 40, a metadata database 42, and a metadata usage table 44, each of which may be implemented in memory such as, but not limited to, RAM. As discussed below in detail, the proxy server 16 operates to store digital images from the peer nodes 12 and 14 in the cache 40. The proxy server 16 may store digital images in the cache 40 after they are requested by the guest node 18 and retrieved from the peer nodes 12 and 14. Additionally, the proxy server 16 may operate to pre-fetch digital images from the peer nodes 12 and 14 to store in the cache 40. Thereafter, subsequent requests for the digital images stored in the cache 40 may be served from the cache 40 rather than from the peer nodes 12 and 14.

The metadata database 42 operates to store metadata describing the digital images stored in the cache 40. Metadata may generally be defined as any information describing the digital images. According to the present invention, the metadata includes keywords applied to digital images by the users 20 or 22 or by users of an associated digital camera. For example, the keywords may be "Christmas," "Christmas 2005," "Kids Sporting Events," "Vacation," and the like. As described below, the metadata describing the digital images is either obtained from the peer nodes 12 and 14 or extracted from the digital images by the proxy server 16. For example, digital images stored in the Joint Photographic Experts Group (JPEG) format include Exchangeable Image Format (EXIF) headers including information such as keywords applied to the digital images, captions, date and time of capture, location of capture, flash setting, focal length, and the like.

As also discussed below, the metadata usage table 44 may store a number of "hits" for each of a number of keywords associated with the digital images stored in the cache 40. The metadata usage table 44 may also store time-stamps for the keywords indicating the last time that digital images tagged with the keywords were requested. In operation, each time a request is received by the proxy server 16 for a digital image, the proxy server 16 identifies the keywords used to tag the digital image by examining the metadata associated with the digital image. Once the keywords for the digital image are identified, the proxy server 16 increments "hit" counters associated with the keywords stored in the metadata usage table 44. Thereafter, when the proxy server 16 desires to remove digital images from the cache 40 due to, for example, reaching a predetermined storage limit, the proxy server 16 may examine the metadata usage table 44 to determine a popularity of each of the keywords and remove digital images associated with one or more of the least popular keywords from the cache 40. As a result, the digital images associated with the most popular keywords remain in the cache 40.

Optionally, the proxy server 16 may also include an additional content database 46. As discussed below, the proxy server 16 may add additional content such as advertisements to digital images provided to the guest node 18 based on the metadata for the digital images.

The guest node 18 may be a personal computer, mobile terminal, Personal Digital Assistant, or the like having access to the network 26 and including a web browser 48. In operation, the guest node 18, and more specifically the web browser 48, operates to request digital images, or photo album web pages, from one or more of the peer nodes 12 and 14 via the proxy server 16.

Figure 2:
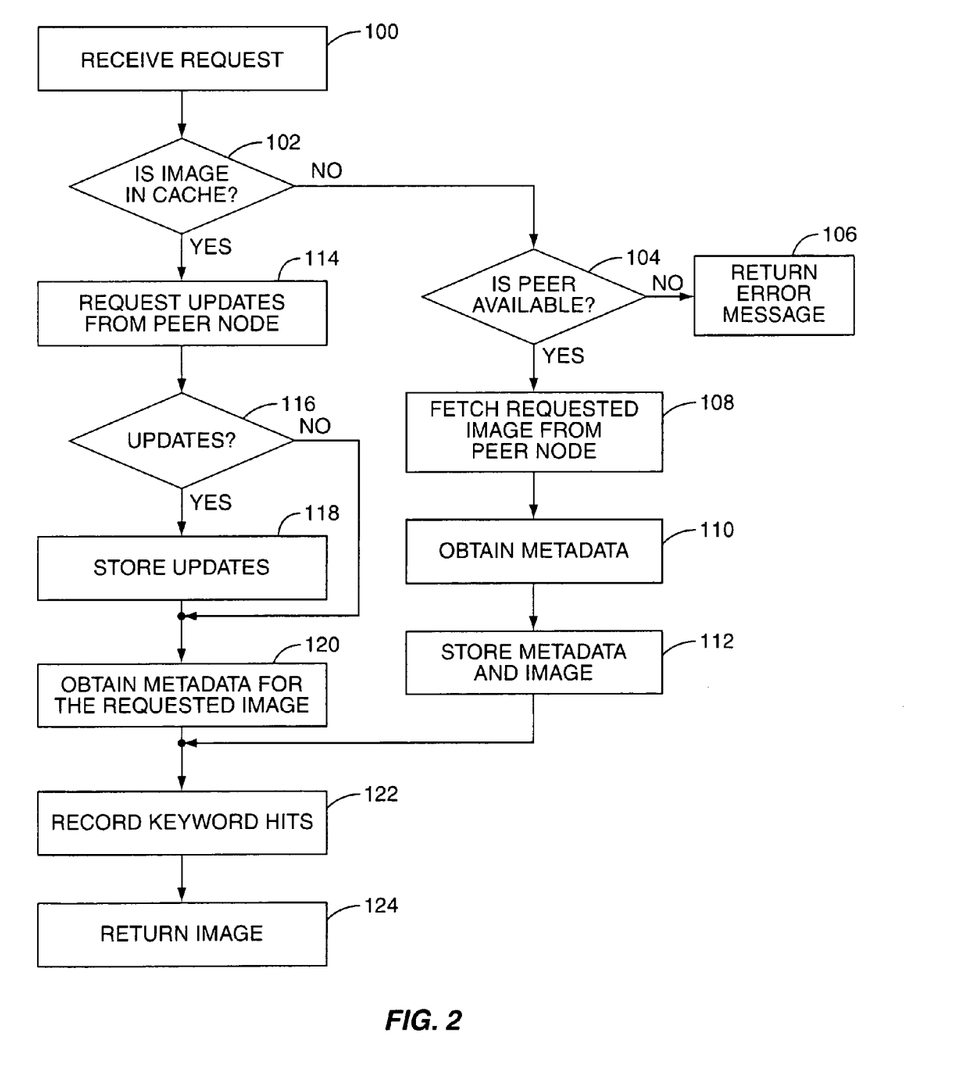
FIG. 2 is a flow chart illustrating the operation of a request processor of the caching proxy server of FIG. 1 according to one embodiment of the present invention.

FIG. 2 illustrates the operation of the request processor 36 of the proxy server 16 according to one embodiment of the present invention. First, the proxy server 16, and specifically the request processor 36, receives a request for a digital image from the guest node 18 (step 100). Note that the request may alternatively be for a number of digital images such as a photo album web page including a number of digital images. However, for simplicity, the following discussion focuses on a single digital image. Upon receiving the request, the request processor 36 determines whether the requested digital image is stored in the cache 40 (step 102). If the requested digital image is not stored in the cache 40, the request processor 36 then determines whether the one of the peer nodes 12 and 14 hosting the requested digital image, which for this example is the peer node 12, is available (step 104). The peer node 12 may be unavailable when, for example, the peer node 12 is not connected to the network 26 or when the peer software 28 is disabled. If the peer node 12 is not available, the proxy server 16 returns an error message to the guest node 18, wherein the error message is communicated to the user 24 via the web browser 48 (step 106).

If the peer node 12 is available, the request processor 36 fetches the requested digital image from the peer node 12 (step 108). More specifically, the request processor 36 sends a request to the peer node 12 for the requested digital image. Upon receiving the request from the proxy server 16, the peer node 12 preferably obtains the metadata for the requested digital image from a local database or by extracting the metadata from the headers of the requested digital image file, and sends the digital image and the metadata for the digital image to the proxy server 16. For example, the peer node 12 may send a Hypertext Transfer Protocol (HTTP) response including the digital image in the body of the response and the metadata for the digital image in the headers of the response. Note that the metadata may still be stored in the headers of the requested digital image file. However, by providing the metadata to the proxy server 16 directly, the proxy server 16 does not have to spend additional processing time to extract the metadata from the requested digital image file. However, as an alternative, the peer node 12 may send the requested digital image to the proxy server 16, wherein the proxy server 16 extracts the metadata from the digital image file.

Upon receiving the response from the peer node 12, the request processor 36 obtains the metadata for the requested digital image (step 110). As discussed above, the metadata is preferably sent as part of the response, which may be an HTTP response. However, if the metadata for the requested digital image is not part of the response, the request processor 36 may obtain the metadata for the requested digital image by extracting the metadata from the headers of the digital image file.

The request processor 36 then stores the metadata, or a portion thereof, for the requested digital image in the metadata database 42 and stores the requested digital image in the cache 40 (step 112). In one embodiment, the request processor 36 may remove the metadata, or headers, from the requested digital image prior to storing the requested digital image in the cache 40. As a result, the requested digital image requires less storage space within the cache 40. Also, the request processor 36 may operate to normalize the keywords used to tag the requested digital image prior to storing the metadata for the requested digital image. For example, the request processor 36 may correct misspelled words, truncate words to remove endings such as "-ing," change keywords that are in a short hand or slang form to their traditional form, such as changing "xmas" to "Christmas," and the like. As a result, the information stored in the metadata usage table 44 may provide more accurate keyword hit counts. Alternatively, the keywords may be stored in their original form and normalized before recording keyword hits (see step 122). Note that while the term used herein is "keyword," a keyword may be a word or a phrase including a number of words, characters, numbers, or the like.

Returning to step 102, if the requested digital image is stored in the cache 40, the request processor 36 sends a request for updates for the requested digital image to the peer node 12 (step 114). For example, the request processor 36 may send an HTTP "if-modified-since" message to the peer node 12, wherein the message includes a date that the requested digital image was last requested from the peer node 12 or a date that an update for the requested digital image was last requested from the peer node 12. In response, the peer node 12 determines whether the requested digital image or the metadata for the requested digital image has been modified since the last request from the proxy server 16. If not, the peer node 12 generates and sends a response to the proxy server 16 indicating that there are no updates for the requested digital image. If there are updates, a response including the updates is provided to the proxy server 16. If there are updates to only metadata for the requested digital image, the response may only include the portions of the metadata that have changed. Alternatively, the response may include all of the metadata for the requested digital image. If the requested digital image itself has changed, the response includes the requested digital image and the metadata or updates for the metadata for the requested digital image.

The request processor 36 then determines whether there are updates based on the response from the peer node 12 (step 116). If there are updates, the request processor 36 stores the updated version of the requested digital image in the cache 40 and/or the updated version of the metadata for the requested digital image in the metadata database 42 (step 118). At this point, whether there are updates or not, the request processor 36 obtains the metadata for the requested digital image (step 120). Note that if the metadata was just received from the peer node 12 in step 114, the request processor 36 may already have the metadata. Otherwise, the request processor 36 obtains the metadata for the requested digital image from the metadata database 42.

At this point, whether the requested digital image was stored in the cache 40 or retrieved from the peer node 12, the request processor 36 may record the keyword hits in the metadata usage table 44 (step 122). More specifically, the request processor 36 examines the metadata for the requested digital image to identify the keywords used to tag the requested digital image. Thereafter, the request processor 36 instructs the metadata usage table 44 to increment hit counters associated with the identified keywords. In addition, the request processor 36 may store a time stamp indicating the date and time of receiving the request for the requested digital image from the guest node 18 in association with the identified keywords.

After recording the keyword hits, the request processor 36 sends the requested digital image to the guest node 18 (step 124). In one embodiment, the request processor 36 may also provide the metadata, or a portion thereof, for the requested digital image to the guest node 18. More specifically, as an example, the digital image may be provided to the guest node in an HTTP response wherein the metadata for the requested digital image may be provided in the headers of the HTTP response. As a result, applications on the guest node 18, such as pornography filters, may analyze the metadata for the requested digital image without expending extra processing time to extract the metadata from the digital image file.

Note that the process of FIG. 2 is only exemplary. Numerous variations will be apparent to one of ordinary skill in the art upon reading this disclosure. For example, the proxy server 16 may periodically request updates for each digital image stored in the cache 40. This may be performed as an alternative to or in addition to requesting the updates for the requested digital image in steps 114-118. As another example, in order to provide the requested digital image to the guest node 18 as quickly as possible, it may not be desirable to perform steps 120 and 122 until after the requested image is provided to the guest node 18. Still further, steps 120 and 122 for recording keyword hits may be performed by a separate process based on a queue generated by the request processor 36 providing identifiers for each requested digital image or based on a log file maintained by the proxy server 16.

Figure 3:
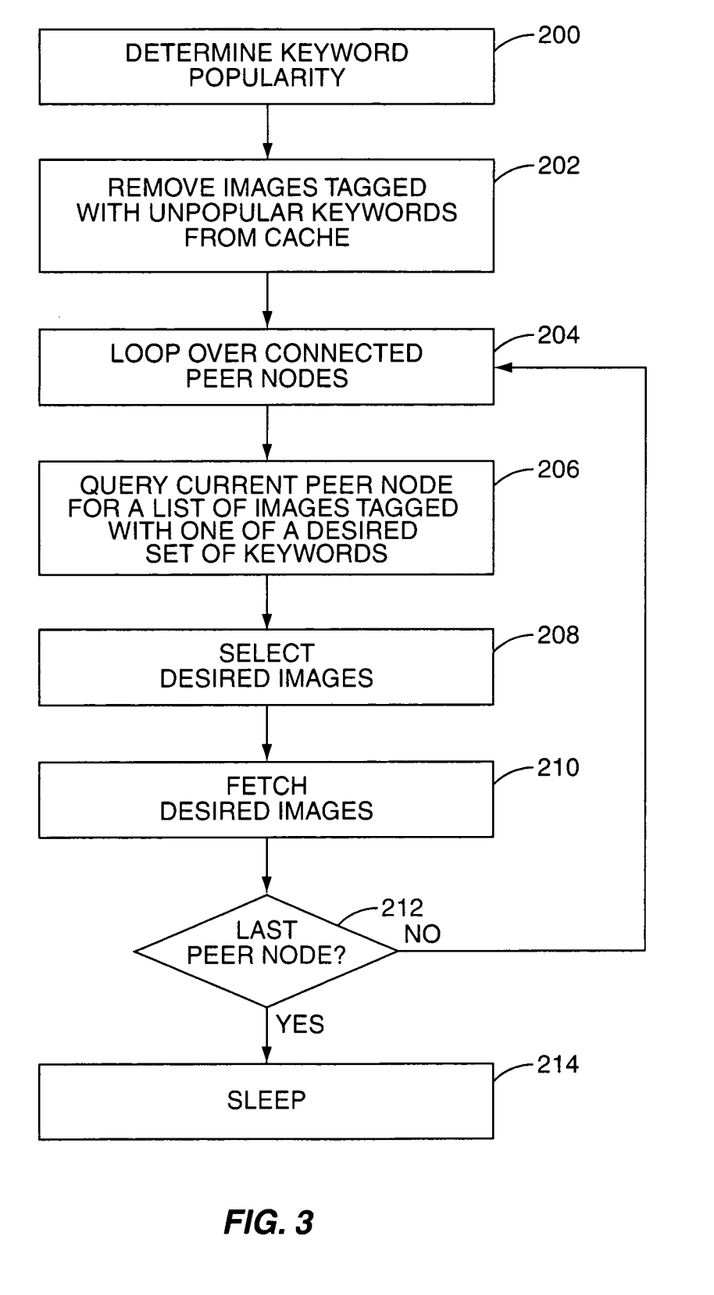
FIG. 3 is a flow chart illustrating the operation of a cache manager of the caching proxy server of FIG. 1 according to one embodiment of the present invention.

FIG. 3 illustrates the operation of the cache manager 38 according to one embodiment of the present invention. In general, the cache manager 38 begins operation in response to some triggering event, such as reaching a predetermined storage limit in the cache 40. In response, the cache manager 38 examines the metadata usage table 44 to determine a popularity of the keywords used to tag the digital images stored in the cache 40 (step 200). In one embodiment, the cache manager 38 identifies the keywords having the highest hit counts as the most popular keywords. In another embodiment, the cache manager 38 determines the popularity of each of the keywords based on the hit counts for the keywords and one or more timestamps indicating when digital images tagged with the keywords were last requested or the frequency at which digital images tagged with the keywords are requested. For example, a keyword having a hit count of 1000 where no digital images tagged with the keyword have been requested in 24 hours may be given a lower popularity than a keyword having a hit count of 500 where a large portion of the 500 hits have occurred in the last hour.

Once the cache manager 38 has determined the popularity of the keywords, the cache manager 38 removes digital images tagged with one or more of the least popular keywords from the cache 40 until the used storage space of the cache 40 has decreased to a desired lower threshold (step 202). For example, the cache manager 38 may first remove digital images from cache that are only tagged with the least popular keyword. If more digital images need to be removed, the cache manager 38 may remove the digital images from the cache 40 that are only tagged with the two least popular keywords. The cache manager 38 may continue this process until the lower threshold is reached.

In this example, the cache manager 38 now proceeds to perform pre-fetching operations (steps 204-212). However, note that steps 204-212 are optional. To perform the pre-fetching operations, the cache manager 38 loops over the peer nodes 12 and 14 that are currently available or connected to the proxy server 16 (step 204). Thus, the cache manager 38 queries the peer node 12 for a list of digital images tagged with one of a desired set of keywords (step 206). The returned list may include an identifier of each of the digital images stored at the peer node 12 that are tagged with one or more of the desired set of keywords. In addition, the list may include the metadata, or a portion thereof, for each of the digital images. The list may include an identifier such as a file name and keywords for each of the digital images stored at the peer node 12 that are tagged with one or more of the set of desired keywords.

In one embodiment, the desired set of keywords may include any number of the most popular keywords determined in step 200. The desired set of keywords may include the two most popular keywords such that the cache manager 38 queries the peer node 12 for a list of digital images stored at the peer node 12 that are tagged with one or both of the two most popular keywords.

In another embodiment, the desired set of keywords may include one or more keywords selected by the proxy server 16 based on temporal proximity. For example, the proxy server 16 may receive a request for a digital image that is tagged with the keyword "dog." The proxy server 16 may know from past experience that a request for a digital image tagged with the keyword "dog" is often followed by a request for a keyword tagged with the keyword "cat." As such, the proxy server 16 may desire to pre-fetch digital images tagged with the keyword "cat." As another example, the proxy server 16 may select one or more keywords based on a current date or time. For example, the proxy server 16 may know from past experience that digital images tagged with the keyword "Christmas" are frequently requested from December 1st until January 10th. As such, if the current date is in the range of January 4th through January 10th, the proxy server 16 may desire to pre-fetch digital images tagged with the keyword "Christmas" or "xmas."

In yet another embodiment, the desired set of keywords may include one or more keywords selected by the proxy server 16 based on location. For example, if the proxy server 16 is located in Colorado, the proxy server 16 may monitor requests from guest nodes, such as the guest node 18, within Colorado to determine popular keywords among users in Colorado. For example, "snowboarding" may be identified by the proxy server 16 as a popular keyword among users in Colorado. As such, the proxy server 16 may desire to pre-fetch digital images tagged with the keyword "snowboarding."

Upon receiving the list of digital images tagged with one or more of the desired set of keywords from the peer node 12, the cache manager 38 selects desired images from the list of digital images (step 208). In one embodiment, the cache manager 38 may automatically select all of the digital images in the list of digital images. In another embodiment, the cache manager 38 may select digital images from the list of digital images based on file size. For example, the cache manager 38 may select digital images from the list of digital images that have a file size below a predetermined limit. In yet another embodiment, the cache manager 38 may select digital images from the list of digital images based on the number of the desired set of keywords with which the digital images are tagged. For example, the cache manager 38 may select the digital images from the list of digital images that are tagged with at least two of the keywords from the set of desired keywords.

Once the desired digital images are selected, the cache manager 38 fetches the desired digital images from the peer node 12, stores the digital desired digital images in the cache 40, and stores the metadata for the desired digital images in the metadata database 42, thereby pre-fetching the desired digital images (step 210).

At this point, the cache manager 38 determines whether it has looped over all of the available peer nodes 12 and 14 (step 212). If not, steps 204-212 are repeated until the desired digital images are pre-fetched from all of the available peer nodes 12 and 14. Thereafter, the cache manager 38 enters a "sleep" or "idle" state until a triggering event restarts the process (step 214). Note that if the pre-fetching operations cause the used storage space in the cache 40 to exceed the predetermined limit, steps 200 and 202 may be repeated. Alternatively, the cache manager 38 may intelligently decide which digital images and how many digital images to pre-fetch from the peer nodes 12 and 14 such that the pre-fetching operations do not cause the used storage space in the cache 40 to exceed the predetermined limit.

Again, note that the operation of the cache manager 38 illustrated in FIG. 3 is exemplary. Numerous variations will be apparent to one of ordinary skill in the art. For example, steps 204-212 may be implemented in a separate process that may be continuously performed. As another example, desired digital images may be pre-fetched from the peer nodes 12 and 14 concurrently. More specifically, there may be separate software process threads for each of the peer nodes 12 and 14 operating concurrently to pre-fetch desired digital images from the peer nodes 12 and 14.

Figure 4:
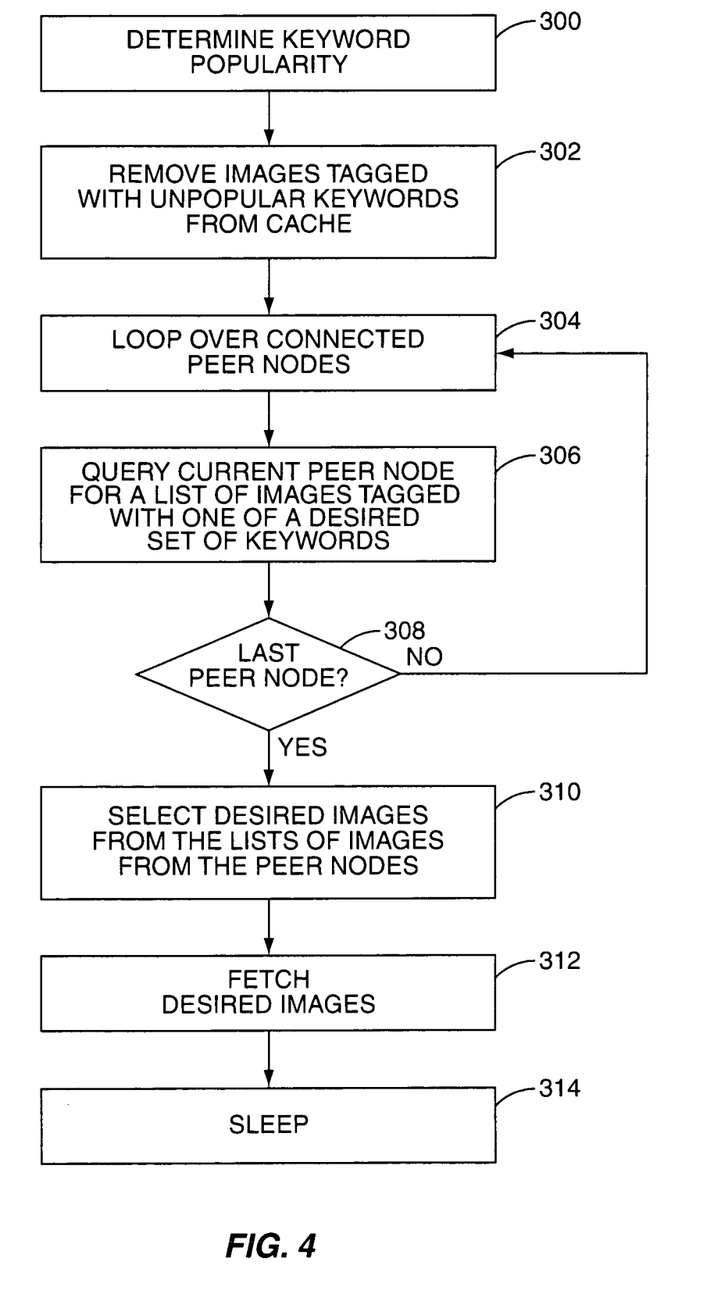
FIG. 4 is a flow chart illustrating the operation of a cache manager of the caching proxy server of FIG. 1 according to another embodiment of the present invention.

FIG. 4 illustrates the operation of the cache manager 38 according to another embodiment of the present invention. This embodiment is substantially the same as that in FIG. 3. However, the desired digital images are selected by the cache manager 38 and pre-fetched from the peer nodes 12 and 14 after querying all of the peer nodes 12 and 14 rather than after querying each of the individual peer nodes 12 and 14.

The cache manager 38 begins operation in response to some triggering event, such as reaching a predetermined storage limit in the cache 40. In response, the cache manager 38 examines the metadata usage table 44 to determine a popularity of the keywords used to tag the digital images stored in the cache 40 (step 300). Once the cache manager 38 has determined the popularity of the keywords, the cache manager 38 removes the digital images tagged with one or more of the most unpopular keywords from the cache 40 until the used storage space of the cache 40 has fallen to a desired lower threshold (step 302).

To perform the pre-fetching operations, the cache manager 38 loops over the peer nodes 12 and 14 that are currently available or connected to the proxy server 16 (step 304). Thus, the cache manager 38 queries the peer node 12 for a list of digital images tagged with one of a desired set of keywords (step 306). The returned list may include an identifier of each of the digital images stored at the peer node 12 that are tagged with one or more of the desired set of keywords. In addition, the list may include the metadata, or a portion thereof, for each of the digital images.

Upon receiving the list of digital images tagged with one or more of the desired set of keywords from the peer node 12, the cache manager 38 determines whether all of the available peer nodes 12 and 14 have been queried (step 308). If not, steps 304 and 306 are repeated for the rest of the available peer nodes.

The cache manager 38 then selects desired images from the lists of digital images from the peer nodes 12 and 14 (step 310). In one embodiment, the cache manager 38 may automatically select all of the digital images in the lists of digital images. In another embodiment, the cache manager 38 may select digital images from the lists of digital images based on file size. For example, the cache manager 38 may select digital images from the lists of digital images that have a file size below a predetermined limit. In yet another embodiment, the cache manager 38 may select digital images from the lists of digital images based on the number of the desired set of keywords with which the digital images are tagged. For example, the cache manager 38 may select the digital images from the lists of digital images that are tagged with at least two of the keywords from the set of desired keywords.

Once the desired digital images are selected, the cache manager 38 fetches the desired digital images from the peer nodes 12 and 14, stores the desired digital images in the cache 40, and stores the metadata for the desired digital images in the metadata database 42, thereby pre-fetching the desired digital images (step 312). The cache manager 38 then enters a "sleep" or "idle" state until a triggering event restarts the process (step 314).

Note that if the pre-fetching operations cause the used storage space in the cache 40 to exceed the predetermined limit, steps 300 and 302 may be repeated. Alternatively, the cache manager 38 may intelligently decide which digital images and how many digital images to pre-fetch from the peer nodes 12 and 14 such that the pre-fetching operations do not cause the used storage space in the cache 40 to exceed the predetermined limit.

Again, the operation of the cache manager 38 illustrated in FIG. 4 is exemplary. Numerous variations will be apparent to one of ordinary skill in the art. For example, steps 304-312 may be performed in a separate process that may be continuously performed. As another example, desired digital images may be pre-fetched from the peer nodes 12 and 14 concurrently. More specifically, there may be separate software process threads for each of the peer nodes 12 and 14 operating currently to pre-fetch desired digital images from the peer nodes 12 and 14.

Figure 5:
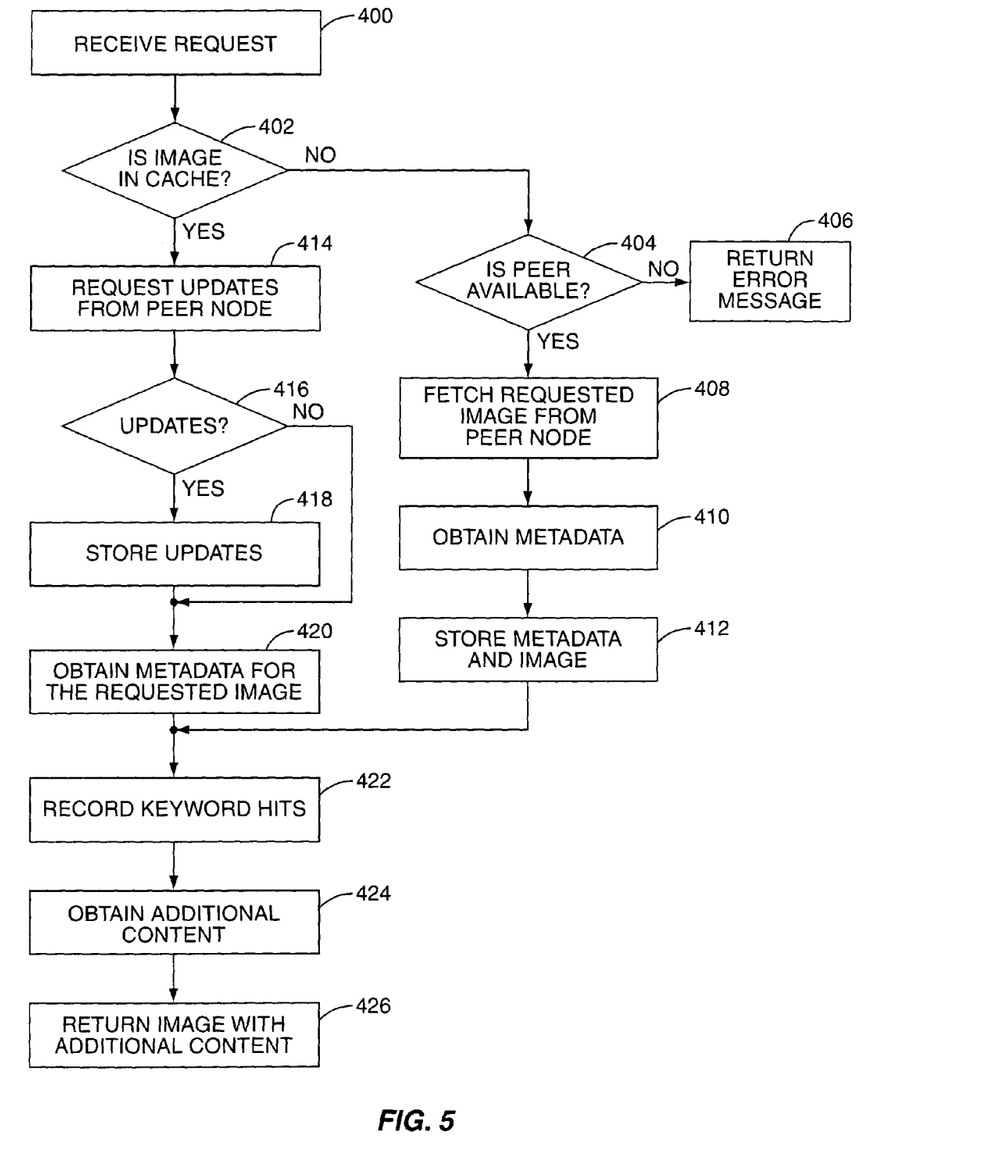
FIG. 5 is a flow chart illustrating the operation of a request processor of the caching proxy server of FIG. 1 wherein the request processor provides a requested digital image and additional content such as an advertisement to a guest node according to one embodiment of the present invention.

FIG. 5 illustrates the operation of the request processor 36 wherein the request processor 36 provides additional content, such as an advertisement, in addition to the requested digital image. Steps 400-422 are the same as steps 200-222 described above with respect to FIG. 2. As such, the details of these steps will not be repeated for conciseness. In general, the request processor 36 receives a request for a digital image from the guest node 18 (step 400). If the digital image is not stored in the cache 40, the request processor 36 determines whether the peer node 12 hosting the digital image is available (steps 402 and 404). If the peer node 12 is available, the request processor 36 fetches the requested digital image from the peer node 12, obtains the metadata for the requested digital image, stores the metadata in the metadata database 42, and stores the digital image in the cache 40 (steps 408-412). If the requested digital image is stored in the cache 40, the request processor 36 requests updates for the requested digital image and the metadata for the requested digital image from the peer node 12, stores any updates, and obtains the metadata for the requested digital image (steps 414-420). The request processor 36 then records the keyword hits in the metadata usage table 44 (step 422).

At this point, the operation of the request processor 36 diverges from the operation described with respect to FIG. 2. More specifically, the request processor 36 obtains additional content for the requested digital image based on the metadata for the requested digital image (step 424). Preferably, the request processor 36 obtains one or more keywords used to tag the requested digital image from the metadata for the requested digital image. Using the keywords, the request processor 36 queries the additional content database 46 to obtain additional content such as an advertisement. The additional content database 46 may, for example, store a number of textual or graphic advertisements, where each of the advertisements is associated with one or more predetermined keywords. As such, when the additional content database 46 is queried with a keyword or combination of keywords, the additional content database 46 may return an advertisement matching the keyword or combination of keywords. For example, if one of the keywords used to tag the requested digital image is "snowboarding," the advertisement "http://www.snowboarding.com" may be provided from the additional content database 46. In addition to the keywords, other metadata such as the date and time of capture, the location of capture, and the like may be used to query the additional content database 46.

Figure 6A:
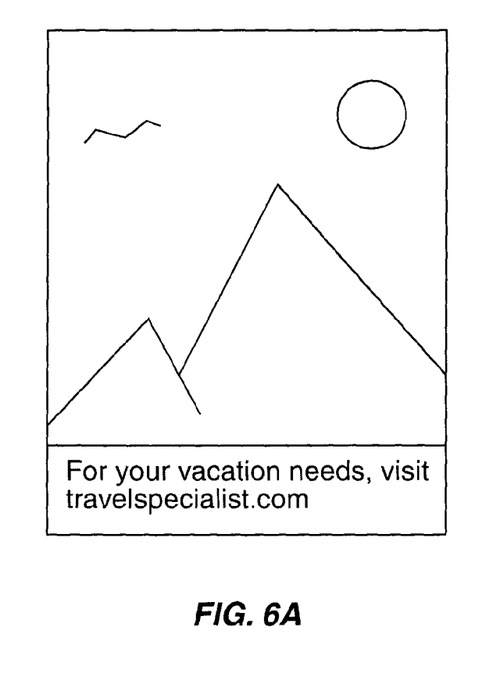
FIGS. 6A and 6B illustrate two exemplary methods for providing additional content to a guest node according to one embodiment of the present invention.
Figure 6B:
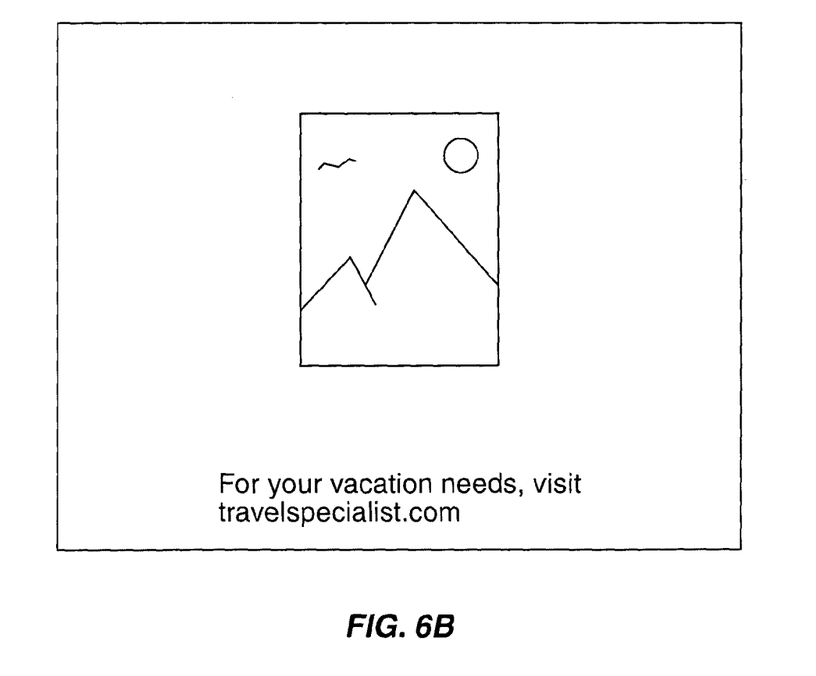

Once the additional content is obtained, the request processor 36 returns the requested digital image and the additional content to the guest node 18 (step 426). The additional content may be a textual or graphical advertisement either added to the digital image by modifying the digital image or added to a web page on which the digital image is displayed. FIG. 6A illustrates an example of a digital image modified to include an advertisement below the original digital image. As an alternative, the digital image may be modified such that the advertisement appears above the original digital image, to the side of the original digital image, or within the original digital image as, for example, a watermark. FIG. 6B illustrates an example of a web page including the requested digital image wherein an advertisement is added to the web page.

Figure 7:
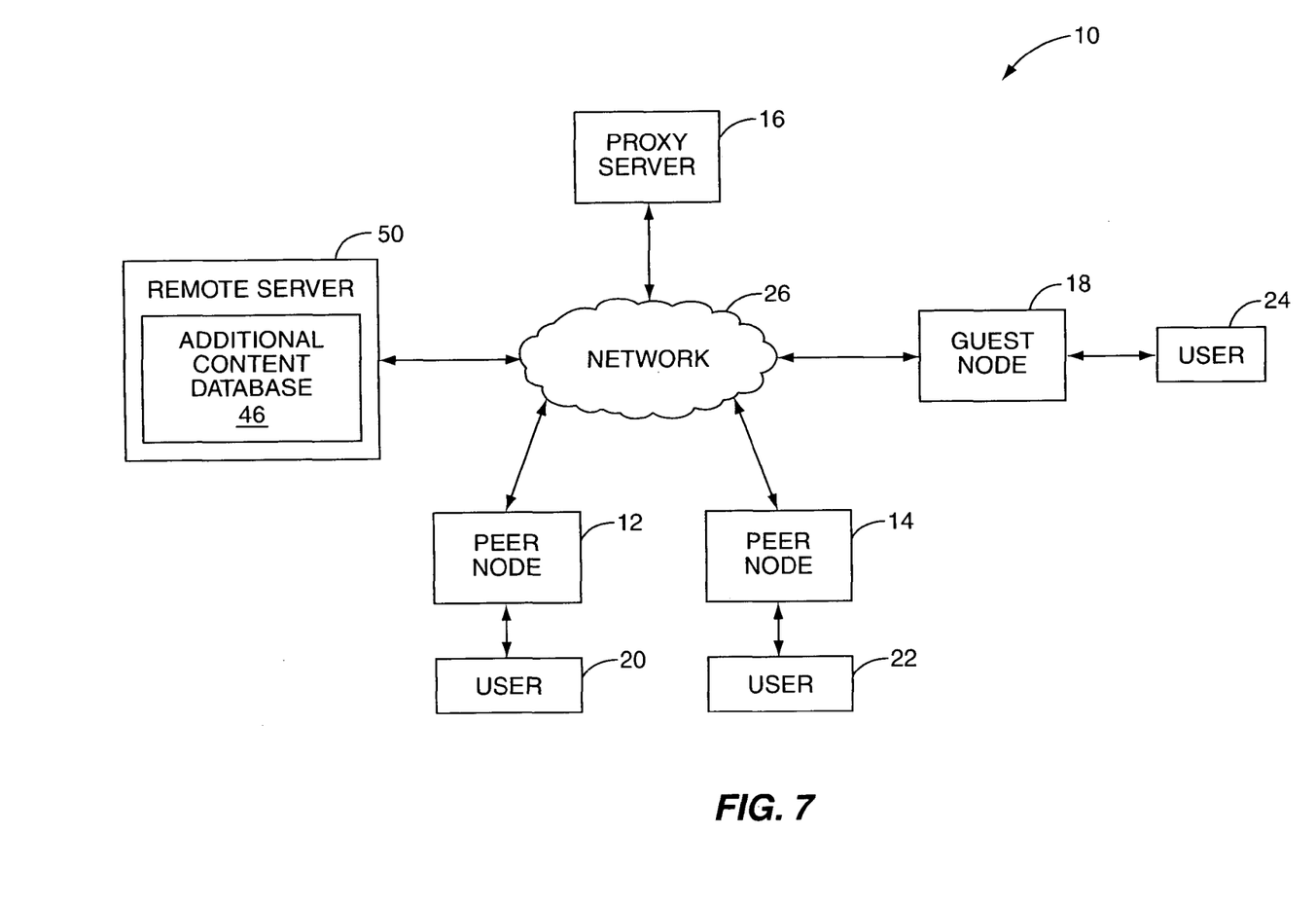
FIG. 7 illustrates an second exemplary embodiment of a hybrid peer-to-peer (P2P) system incorporating a caching proxy server and a remote server hosting an additional content database according to one embodiment of the present invention.

FIG. 7 illustrates a second embodiment of the hybrid P2P system 10. This embodiment of the hybrid P2P system 10 includes the peer nodes 12 and 14, the proxy server 16, the guest node 18, the users 20-24, and the network 26. However, in this embodiment, the additional content database 46 is located on a remote server 50 rather than on the proxy server 16. As such, when it is desired to add additional content, as described above with respect to FIG. 5, the request processor 36 of the proxy server 16 may query the additional content database 46 at the remote server 50 to obtain the additional content.

Figure 8:
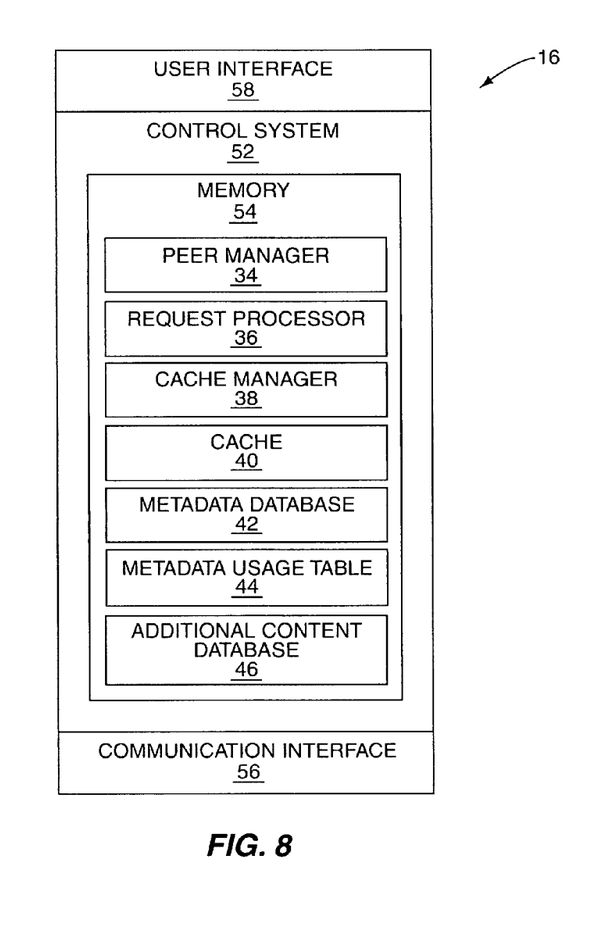
FIG. 8 is a block diagram of an exemplary embodiment of the caching proxy server according to one embodiment of the present invention.

FIG. 8 is a block diagram of one embodiment of the proxy server 16. In general, the proxy server 16 includes a control system 52 having associated memory 54. The memory 54 stores the peer manager 34, the request processor 36, and the cache manager 38, which in this example are implemented in software. However, the peer manager 34, the request processor 36, and the cache manager 38 may alternatively be implemented in hardware or a combination of software and hardware. The cache 40, the metadata database 42, and the metadata usage table 44 may also implemented in the memory 54. Optionally, the additional content database 46 may also be implemented in the memory 54. However, note that the additional content database 46 may alternatively be implemented on the remote server 50, as illustrated in FIG. 7. In addition, the cache 40, the metadata database 42, the metadata usage table 44, or any combination thereof may be persisted in a storage device such as a hard disc drive such that they are not lost due to, for example, a power failure. The proxy server 16 also includes a communication interface 56 communicatively coupling the proxy server 16 to the network 26. In addition, the proxy server 16 may include a user interface 58 including components such as, but not limited to, a display, a keyboard, and the like.

Figure 9:
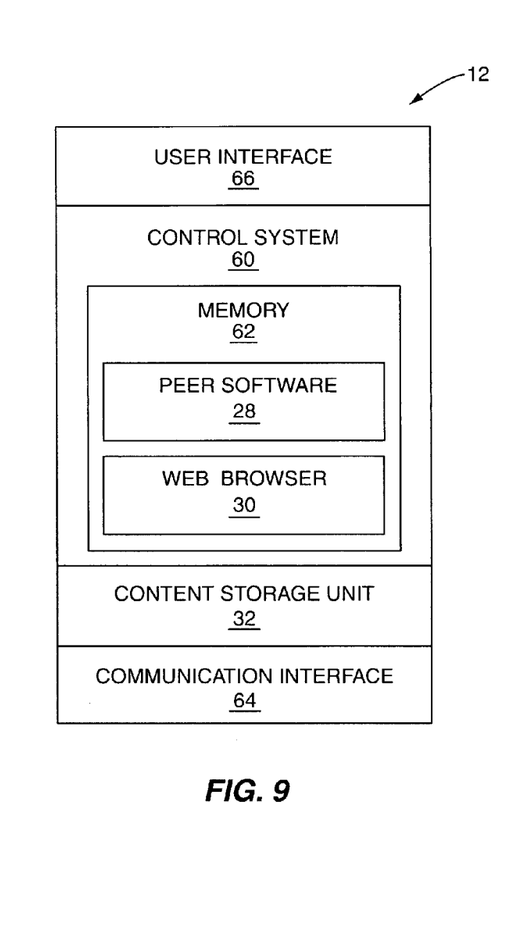
FIG. 9 is a block diagram of an exemplary embodiment of a peer node in the hybrid P2P system according to one embodiment of the present invention.

FIG. 9 is a block diagram of an exemplary embodiment of the peer node 12 according to one embodiment of the present invention. Note that this discussion of the peer node 12 is equally applicable to the peer node 14. In general, the peer node 12 includes a control system 60 having associated memory 62. The memory 62 stores the peer software 28 and the web browser 30. The peer node 12 also includes a content storage unit 32, which may alternatively be implemented in the memory 62. The peer node 12 also includes a communication interface 64 communicatively coupling the peer node 12 to the network 26. The peer node 12 also includes a user interface 66 including components such as, but not limited to, a display, a keyboard or input keys, and the like.

Those skilled in the art will recognize improvements and modifications to the preferred embodiments of the present invention. All such improvements and modifications are considered within the scope of the concepts disclosed herein and the claims that follow.

What is claimed is:

1. A proxy server comprising:
   a) a communication interface adapted to communicatively couple the proxy server to a network;
   b) cache adapted to store a plurality of previously requested digital assets associated with a plurality of keywords, each keyword of the plurality of keywords being associated with one or more of the plurality of previously requested digital assets and being a descriptor that describes content of the one or more of the plurality of previously requested digital assets, wherein metadata and headers associated with each of the plurality of digital assets is removed prior to storage; and
   c) a metadata usage table adapted to:
      i) store a number of hits in a plurality of hit counters for each keyword of the plurality of keywords associated with the previously requested digital assets stored in the cache; and
      ii) store time stamps for each keyword, the time stamps indicating when a digital asset of the previously requested digit assets stored in the cache was requested;

d) a control system associated with the communication interface and adapted to:
  i) normalize each keyword of the plurality of keywords prior to the plurality of keywords being stored in the cache;
  ii) determine a popularity of each of the plurality of keywords;
  iii) manage the cache based on the popularity of each of the plurality of keywords;
  iv) identify ones of the plurality of previously requested digital assets to remove from the cache based on the popularity of each of the plurality of keywords, the popularity being based on the number of hits and the time stamps stored in the metadata usage table;
  v) receive a request for a digital image;
  vi) identify keywords used to tag the requested digital image in response to receiving the request for the digital image by examining metadata associated with the requested digital image;
  vii) in response to identifying the keywords used to tag the requested digital image, increment a hit counter of the plurality of hit counters for the identified keywords used to tag the requested digital image;
  viii) pre-fetch desired digital assets from at least one peer node hosting the desired digital assets, wherein in order to pre-fetch the desired digital assets, the control system is further adapted to:
    A) receive a request for a digital asset tagged with a first keyword;
    B) based on past experience and past requests for assets tagged with the first keyword, determine that requests for digital assets tagged with a second keyword have been made prior to the request for the digital asset tagged with the first keyword and temporally proximate to the past requests for assets tagged with the first keyword; and
    C) send a request to the at least one peer node for the digital assets associated with the second keyword based on determining that requests for the digital assets tagged with the second keyword have been made temporally proximate to the past requests;
  ix) determine a least popular keyword of the plurality of keywords by examining the metadata usage table; and
  x) remove digital images from the cache associated with the least popular keyword.

2. The proxy server of claim 1 wherein in order to determine the popularity of each of the plurality of keywords, the control system is further adapted to:
  for each keyword in the plurality of keywords, determine a number of requests received by the proxy server for digital assets associated with the keyword; and
  determine the popularity of each of the plurality of keywords based on the number of requests received by the proxy server for digital assets associated with each of the plurality of keywords.

3. The proxy server of claim 1 further comprising a metadata database adapted to store metadata comprising at least one of the plurality of keywords for each of the plurality of previously requested digital assets, wherein the control system is further adapted to:
  a) receive a request for a digital asset from a guest node;
  b) determine whether the digital asset requested from the guest node is one of the plurality of previously requested digital assets stored in the cache;
  c) if the digital asset requested from the guest node is not one of the plurality of previously requested digital assets stored in the cache, send a request for the digital asset requested from the guest node to a peer node hosting the digital asset;
  d) receive a response from the peer node comprising the digital asset requested from the guest node and metadata including at least one keyword associated with the digital asset;
  e) store the digital asset requested from the guest node in the cache such that the digital asset requested from the guest node becomes one of the plurality of previously requested digital assets;
  f) store the metadata, or a portion thereof, including the at least one keyword associated with the digital asset requested from the guest node in the metadata database; and
  g) provide the digital asset requested from the guest node to the guest node.

4. The proxy server of claim 3 wherein in order to provide the digital asset requested from the guest node to the guest node, the control system is further adapted to provide a response to the guest node comprising the digital asset requested from the guest node and the metadata, or a portion thereof, for the digital asset requested from the guest node.

5. The proxy server of claim 3 wherein the control system is further adapted to:
  select additional content for the digital asset requested from the guest node based on the metadata for the digital asset requested from the guest node; and
  provide the additional content in addition to the digital asset requested from the guest node to the guest node.

6. The proxy server of claim 1 further comprising a metadata database adapted to store metadata comprising at least one of the plurality of keywords for each of the plurality of previously requested digital assets, wherein the control system is further adapted to:
  a) receive a request for a digital asset from a guest node;
  b) determine whether the digital asset requested from the guest node is one of the plurality of previously requested digital assets stored in the cache;
  c) if the digital asset requested from the guest node is one of the plurality of previously requested digital assets stored in the cache, send a request to a peer node hosting the digital asset requested from the guest node for updates for the digital asset requested from the guest node;
  d) if there are updates for the digital asset requested from the guest node,
    i) receive an updated version of the digital asset requested from the guest node; and
    ii) store the updated version of the digital asset requested from the guest node in the cache as the digital asset requested from the guest node;
  e) if there are updates for the metadata for the digital asset requested from the guest node,
    i) obtain updated metadata including at least one updated keyword for the digital asset requested from the guest node; and
    ii) store the updated metadata for the digital asset requested from the guest node in the metadata database as the metadata for the digital asset requested from the guest node; and
  f) provide the digital asset requested from the guest node to the guest node.

7. The proxy server of claim 6 wherein in order to provide the digital asset requested from the guest node to the guest node, the control system is further adapted to provide a response to the guest node comprising the digital asset requested from the guest node and the metadata, or a portion thereof, for the digital asset requested from the guest node.

8. The proxy server of claim 6 wherein the control system is further adapted to:
  select additional content for the digital asset requested from the guest node based on the metadata for the digital asset requested from the guest node; and
  provide the additional content in addition to the digital asset requested from the guest node to the guest node.

9. The proxy server of claim 1 wherein the control system is further adapted to:
  store the desired digital assets in the cache such that the desired digital assets become ones of the plurality of previously requested digital assets.

10. The proxy server of claim 9 wherein in order to pre-fetch the desired digital assets, the control system is further adapted to:
  determine a current date;
  based on past requests, determine at least one desired keyword associated with digital assets that are likely to be requested on the current date; and
  send a request to the at least one peer node for digital assets associated with the at least one desired keyword.

11. A method comprising:
  storing a plurality of previously requested digital assets associated with a plurality of keywords in cache at a proxy server, each keyword of the plurality of keywords being associated with one or more of the plurality of previously requested digital assets and being a descriptor that describes content of the one or more of the plurality of previously requested digital assets, wherein metadata and headers associated with each of the plurality of digital assets is removed prior to storage;
  storing a number of hits in a plurality of hit counters for each keyword of the plurality of keywords associated with the previously requested digital assets stored in the cache at a metadata usage tables;
  storing time stamps for each keyword, the time stamps indicating when a digital asset of the previously requested digit assets stored in the cache was requested at a metadata usage table;
  normalizing each keyword of the plurality of keywords prior to storing the plurality of keywords;
  determining a popularity of each of the plurality of keywords;
  managing the cache based on the popularity of each of the plurality of keywords;
  identifying ones of the plurality of previously requested digital assets to remove from the cache based on the popularity of each of the plurality of keywords, the popularity being based on the number of hits and the time stamps stored in the metadata usage table;
  receiving a request for a digital image;
  identifying keywords used to tag the requested digital image in response to receiving the request for the digital image by examining metadata associated with the requested digital image;
  in response to identifying the keywords used to tag the requested digital image, incrementing a hit counter of the plurality of hit counters for the identified keywords used to tag the requested digital image;
  pre-fetching desired digital assets from at least one peer node hosting the desired digital assets, wherein pre-fetching the desired digital assets comprises:
    receiving a request for a digital asset tagged with a first keyword;
    based on past experience and past requests for assets tagged with the first keyword, determining that requests for digital assets tagged with a second keyword have been made prior to the request for the digital asset tagged with the first keyword and temporally proximate to the past requests for assets tagged with the first keyword; and
    sending a request to the at least one peer node for the digital assets associated with the second keyword based on determining that requests for the digital assets tagged with the second keyword have been made temporally proximate to the past requests;
  determining a least popular keyword of the plurality of keywords by examining the metadata usage table; and
  removing digital images from the cache associated with the least popular keyword.

12. The method of claim 11 wherein determining the popularity of each of the plurality of keywords comprises:
  for each keyword in the plurality of keywords, determining a number of requests received by the proxy server for digital assets associated with the keyword; and
  determining the popularity of each of the plurality of keywords based on the number of requests received by the proxy server for digital assets associated with each of the plurality of keywords.

13. The method of claim 11 further comprising:
  storing the desired digital assets in the cache such that the desired digital assets become ones of the plurality of previously requested digital assets.

14. The method of claim 13 wherein pre-fetching the desired digital assets comprises:
  determining a current date;
  based on past requests, determining at least one desired keyword associated with digital assets that are likely to be requested on the current date; and
  sending a request to the at least one peer node for digital assets associated with the at least one desired keyword.

15. The proxy server of claim 1 wherein the plurality of keywords are metadata tags applied to the plurality of previously requested digital assets by one or more corresponding users.

16. The method of claim 11 wherein the plurality of keywords are metadata tags applied to the plurality of previously requested digital assets by one or more corresponding users.

* * * * *